United States Patent
Buchmann et al.

(10) Patent No.: US 8,626,334 B2
(45) Date of Patent: Jan. 7, 2014

(54) USER-CONFIGURABLE GUIDANCE SYSTEM OF AN ORDER-PICKING WAREHOUSE AND METHOD FOR CONFIGURING THE ORDER-PICKING WAREHOUSE

(75) Inventors: Rainer Buchmann, Kassel (DE); Markus Schlagbauer, Graz (AT); Robert Kottlan, Trofaiach (AT)

(73) Assignee: SSI Schaefer Peem GmbH, Graz (AT)

( * ) Notice: Subject to any disclaimer, the term of this patent is extended or adjusted under 35 U.S.C. 154(b) by 0 days.

(21) Appl. No.: 13/419,868

(22) Filed: Mar. 14, 2012

(65) Prior Publication Data

US 2012/0232689 A1  Sep. 13, 2012

Related U.S. Application Data (63) Continuation of application No. PCT/EP2010/061269, filed on Aug. 3, 2010.

(30) Foreign Application Priority Data

Sep. 14, 2009 (DE) .......................... 10 2009 042 144

(51) Int. Cl.
*G06Q 10/08* (2012.01)
(52) U.S. Cl.
USPC ............ 700/216; 700/213; 700/214; 701/541
(58) Field of Classification Search
USPC .......................................................... 700/216
See application file for complete search history.

(56) References Cited

U.S. PATENT DOCUMENTS 3,739,339 A * 6/1973 Hillhouse et al. ............... 340/5.9
3,908,800 A * 9/1975 Drapeau ......................... 186/56
4,346,453 A * 8/1982 Drapeau et al. ................. 705/28
(Continued)

FOREIGN PATENT DOCUMENTS

| AT | 7 005 U1 | 7/2004 |
| DE | 41 31 567 | 3/1993 |

(Continued)

OTHER PUBLICATIONS

International Search Report for corresponding patent application No. PCT/EP2010/061269 dated Nov. 17, 2010.

(Continued)

*Primary Examiner* — Gene Crawford
*Assistant Examiner* — Kyle Logan
(74) *Attorney, Agent, or Firm* — Renner, Otto, Boisselle & Sklar, LLP (57) ABSTRACT

A method for manually configuring an order-picking warehouse by using a guidance system comprises equipping at least some of the storage locations with respective storage-location displays; connecting the associated storage-location displays to a master computer via a controller, and allocating to each controller a dedicated controller address; and configuring the order-picking warehouse by assigning respectively dedicated storage-location addresses to the equipped storage locations. All of the displays, which have not yet been assigned a dedicated storage-location address, are visually activated. At least one visually activated display is selected, thereby selecting the associated storage location and causing visual deactivation of the selected storage-location display. Each of the selected storage locations is assigned one dedicated storage-location address. The steps are repeated until all of the associated storage locations have been assigned a dedicated storage-location address, or until the user no longer wishes to assign dedicated storage-location addresses.

16 Claims, 4 Drawing Sheets

(56) References Cited

U.S. PATENT DOCUMENTS

| | | | |
|---|---|---|---|
| 4,750,151 A * | 6/1988 | Baus | 700/90 |
| 5,565,858 A * | 10/1996 | Guthrie | 340/10.33 |
| 6,205,396 B1 * | 3/2001 | Teicher et al. | 701/541 |
| 6,775,588 B1 * | 8/2004 | Peck | 700/214 |
| 7,069,239 B2 * | 6/2006 | Fawcett et al. | 705/28 |
| 7,155,166 B2 * | 12/2006 | Swan | 455/66.1 |
| 7,212,919 B2 * | 5/2007 | Chou et al | 701/533 |
| 8,019,463 B2 * | 9/2011 | Peck | 700/213 |
| 8,073,562 B2 * | 12/2011 | Danelski | 700/216 |

FOREIGN PATENT DOCUMENTS

| | | |
|---|---|---|
| DE | 297 24 869 U1 | 4/2005 |
| DE | 20 2007 005 464 U1 | 9/2007 |
| DE | 10 2007 031 174 A1 | 1/2009 |
| DE | 10 2008 013136 | 9/2009 |
| WO | 99/18528 | 4/1999 |
| WO | 02/057900 | 7/2002 |
| WO | 2008/125678 A1 | 10/2008 |
| WO | 2008/107175 | 11/2008 |

OTHER PUBLICATIONS

English Translation of the Written Opinion of the International Searching Authority for corresponding patent application No. PCT/EP2010/061269.

* cited by examiner

USER-CONFIGURABLE GUIDANCE SYSTEM OF AN ORDER-PICKING WAREHOUSE AND METHOD FOR CONFIGURING THE ORDER-PICKING WAREHOUSE

RELATED APPLICATIONS

This is a continuation application of the co-pending international application PCT/EP2010/061269 (WO 2011/029674 A1) filed on Aug. 3, 2010, which claims priority of the German patent application DE 10 2009 042 144.0 filed on Sep. 14, 2009, which are fully incorporated by reference herewith.

BACKGROUND OF THE INVENTION

The present invention relates to a method for configuring an order-picking warehouse by a user of the order-picking warehouse, wherein the order-picking warehouse comprises a plurality of storage locations and a guidance system comprising a plurality of storage-location displays, a master computer and at least one controller.

The present invention further relates to a user-configurable guidance system.

The present invention also relates to a data carrier comprising computer executable instructions in accordance with the method mentioned above.

RELATED PRIOR ART

Nowadays fully automated order-picking systems are controlled by means of warehouse management systems. The warehouse management systems comprise control, check and optimization of complex storage and distribution processes in order-picking systems. Besides elementary functions of warehouse management, such as quantity management and storage-location management, conveyor device control and conveyor device outline, etc., also extensive methods and means for controlling system conditions as well as a selection of operation and optimization strategies belong to the scope of performance. The software WAMAS sold by the company Salomon Automation GmbH (Graz, Austria) represents a good example thereof.

However, the administration of conventional simple order-picking warehouses is more difficult. As a rule, simple order-picking warehouses consist of a number of racks and other storage locations such as pallet storage locations. In these cases, articles and products are picked from the racks and from the pallets. Degree of automation is almost null in this type of warehouse. Consequently, there is a need to allow retrofitting of such simple warehouses with a modern guidance system, thereby producing faster, safer, and more efficient order-picking processes and warehouse management.

However, known "pick-by-light" systems have deficiencies as well. The warehouse management software in conventional "pick-by-light" systems is supplied by the manufacturer of the warehouse. The supplied management software is complex to such an extent that buyers of the warehouse themselves cannot put the software into operation. For this purpose, IT specialists are required. Therefore, it is desirable to provide a warehouse management system and a retrofittable guidance system having integrated warehouse management functions which can be put into operation by the operator of the warehouse himself without the need to request IT specialists.

The German patent application DE 10 2007 031 174 A1 discloses a system for monitoring storage bins in a storage rack for enhancing a supply-chain process or a delivery process. Briefly before a storage bin is emptied, filling process for this bin is to be triggered automatically. The relevant storage bin is orientated in a specific manner, e.g. rotated about 180°, for indicating an imminent emptying of the storage bin. Optionally, means can be provided which detect a corresponding orientation and thereby trigger a supply and refill process.

The German utility model DE 20 2007 005 464 U1 discloses a device of a tray type which can be mounted to an order-picking trolley. The device serves for receiving an order-picking list, and is provided with a display element such as an LED guiding the picker optically through the order-picking list in terms of lines.

The German utility model DE 297 24 896 U1 discloses a storage device.

SUMMARY OF THE INVENTION

Therefore, it is an object of the present invention to provide a user-configurable guidance system for order-picking warehouses, which can be conventional, the guidance system allowing supplementary installation without specific IT knowledge.

According to a first aspect of the invention an order-picking warehouse which comprises: a plurality of storage locations and a guidance system; wherein the guidance system comprises a plurality of storage-location displays, a master computer, and at least one controller; a method for manually configuring the order-picking warehouse by using the guidance system comprises the following steps: equipping at least some of the storage locations with respectively one of the storage-location displays so that each of the equipped storage locations is associated with the one of the storage-location displays; connecting the associated storage-location displays to the master computer via the at least one controller, and allocating to each of the controllers a dedicated controller address; and configuring the order-picking warehouse by assigning respectively one dedicated storage-location address to each of the equipped storage locations in that: i.) all of the associated storage-location displays, which have not yet been assigned a dedicated storage-location address, are visually activated; ii.) at least one of the visually activated storage-locations display is selected by the user, thereby selecting the associated storage location and causing visual deactivation of the selected storage-location display; iii.) each of the selected storage locations is respectively assigned one dedicated storage-location address; and iv.) it is returned to step i.) until all of the associated storage locations, which have not yet been assigned a dedicated storage-location address, have been assigned a dedicated storage-location address, or until the user no longer wishes to assign dedicated storage-location addresses.

The allocation of addresses can be performed by a warehouse worker, wherein the addresses can be different to IP addresses. Any arbitrary address can be allocated, in the simplest case continuous numbers are allocated. The guidance system of the present invention guides the warehouse worker through the configuration of the order-picking warehouse. Faults are excluded. The storage locations which are not yet allocated are indicated to the warehouse worker by means of lamps, who can simply select non-allocated storage locations by subsequently actuating an actuating button of a storage-location display assigned to a desired storage location. As soon as this selection by actuating the actuating button is made, the lamp of the selected storage-location display goes out. Then, this storage location is no longer available for a new assignment. This procedure can be repeated many times until all of the storage locations in the order-picking warehouse are allocated.

Preferably, the storage location (IP-) address, which is assigned to each of the selected storage locations, is preset by the master computer.

Also this measure decreases possible faults which can be produced by the warehouse worker. The warehouse worker only selects the location but no longer the address. Thus, a double assignment of addresses is no longer possible.

With a particular embodiment the storage location (IP-) address, which is preset by the master computer, is incremented automatically by one after one cycle of the steps i) to iii).

In particular, the selection of the step iii) happens by manually actuating the actuating button which belongs to the storage-location display. With another advantageous embodiment in the step i) a not yet assigned number, which corresponds to a storage location (IP-) address which is currently to be allocated, is displayed in a respective numerical display of the storage-location display.

Thus, the warehouse worker knows at any time how many of the storage locations are already assigned. Among other things, this facilitates check of assignments, for example, if the warehouse worker holds in his hands a list having different positions which are to be assigned to the storage locations.

Preferably, an arrangement of the physical order-picking warehouse is virtually mapped by the user on a layout area, which has a grid-shaped structure, in the master computer by means of pre-defined warehouse elements such as storage racks of different sizes, or pallet storage locations.

Thus, the warehouse worker can map virtually in the master computer the actual physical structure of the warehouse, in which he has been working eventually for many years, without any problem. For this purpose, a grid-shaped structured layout area is offered. The layout area can be filled by preset warehouse elements. The master computer does not allow overlaps, for example, of racks except that the overlaps are desired.

Another advantage is to be seen in that the user in an additional step can assign product data to each addressed storage location in that the user walks along the lighted storage locations and pushes (selects) the corresponding actuating buttons, or the warehouse worker sets up a data base connection for assigning the storage locations (including the storage location (IP-) addresses) to respective product information.

In this manner it is possible to assign one product to each of the storage locations, wherein the product is intended to be stored at the respective storage location. The assignment between the storage locations and the products either is performed manually in that the warehouse worker walks to the storage locations, for example, on the basis of a product list, and assigns the products line-by-line by actuating the actuating buttons of the storage-location displays. Alternatively, this can also be performed by means of a batch-mode run, wherein data of a product list is automatically merged with a storage-location list.

It goes without saying that the assignment "product—storage location" can also be performed at the same time as the assignment "storage location—address".

With another particular embodiment the user saves an assembly instruction assigned to the picking order in the master computer, wherein individual steps for assembling an object by means of the products retrieved from the storage locations are graphically indicated, preferably by means of photos, to the order-picking person on a display of the master computer.

The present invention still goes a step further than the mere distribution of products to racks in an order-picking warehouse. Additionally, assembly instructions for end products such as a personal computer can be displayed by means of the guidance system of the present invention. Especially in the field of assembly of personal computers a plurality of possibilities exist which are determined essentially by the specific desire of the customer. The guidance system of the present invention is able to display the manner in which the desired personal computer is to be assembled as a function of the customers wish. For this purpose, a corresponding data base including assembly instructions can be stored in the master computer. In this case, the warehouse worker gets indicated step-by-step which of the products must be retrieved from which of the storage locations, and where to assemble the retrieved product in turn.

With another advantageous embodiment a plurality of different picking orders in an order list is stored in the master computer.

The guidance system of the invention is able to process different picking orders. This is independent of the complexity of the picking orders. The picking orders normally consist of a sequence of order lines, wherein each of the order lines in turn consists of a predetermined quantity of a product type.

According to a second aspect of the invention a user-configurable guidance system of an order-picking warehouse, which comprises a plurality of storage locations which can be of different types, wherein the guidance system comprises: a plurality of storage-location displays; a master computer adapted to transmit instructions to the storage-location displays for indicating to a user of the warehouse storage locations and quantities of items to be picked from the storage locations in accordance with a picking order; and at least one controller connected to the plurality of storage displays and the master computer, the at least one controller allowing transmission of the instructions of the master computer in an addressed manner to the storage-location displays; wherein respectively one of the storage-location displays is arranged at least at some of the storage locations so that the respectively one of the storage-location displays is associated with the corresponding storage location, wherein the storage-location displays respectively comprise a light, which can be activated and deactivated, and at least one push button; and wherein the master computer is adapted to: i.) visually activate all of the associated storage-location displays, which have not yet been assigned a dedicated storage-location address; ii.) cause visual deactivation of one of the visually activated storage-location displays, if the one of the visually activated storage-locations display is selected by the user for selecting the associated storage location; iii.) respectively assigned one dedicated storage-location address to each of the selected storage locations; and iv.) return to step i.) until all of the associated storage locations, which have not yet assigned a dedicated storage-location address, have been assigned a dedicated storage-location address, or until the user no longer wishes to assign dedicated storage-location addresses.

Further, it is preferred that the guidance system additionally comprises mounting rails, which are attachable to the storage locations and which are adapted to removably receive the storage-location displays.

In particular, the at least one controller is part of the master computer.

This variation is selected in such cases where the order-picking warehouse is planned completely new, i.e. the guidance system is not configured in terms of a retrofit assembly kit. In this case, functionality of the controller can already be integrated directly into the master computer.

With a particular embodiment the master computer comprises a program memory.

In the program storage an algorithm of the present invention can be recorded in order to allow execution of the invention.

In particular, the master computer comprises a display assisting the user during configuration of the order-picking warehouse in a visual manner in that, for example, numbers are displayed.

According to a third aspect of the invention a computer-readable data carrier comprising computer-executable instructions for performing the method of configuring an order-picking warehouse, the order-picking warehouse comprising: a plurality of storage locations and a guidance system; wherein the guidance system comprises a plurality of storage-location displays, a master computer, and at least one controller; wherein at least some of the storage locations are equipped with respectively one of the storage-location displays so that each of the equipped storage locations is associated with the one of the storage-location displays; wherein the associated storage-location displays are connected to the master computer via the at least one controller, and to each of the controllers a dedicated controller address is allocated; the method comprising the step of configuring the order-picking warehouse by assigning respectively one dedicated storage-location address to each of the equipped storage locations in that: i.) all of the associated storage-location displays, which have not yet been assigned a dedicated storage-location address, are visually activated; ii.) at least one of the visually activated storage-locations display is selected by the user, thereby selecting the associated storage location and causing visual deactivation of the selected storage-location display; iii.) each of the selected storage locations is respectively assigned one dedicated storage-location address; and iv.) it is returned to step i.) until all of the associated storage locations, which have not yet assigned a dedicated storage-location address, have been assigned a dedicated storage-location address, or until the user no longer wishes to assign dedicated storage-location addresses It is clear that the above-mentioned and hereinafter still to be explained features cannot only be used in the respectively given combination but also in other combinations or alone, without departing from the scope of the present invention.

BRIEF DESCRIPTION OF THE DRAWINGS

Embodiments of the invention are illustrated in the drawings and will be explained in more detail in the following description, wherein.

PREFERRED EMBODIMENTS OF THE INVENTION

Figure 1:
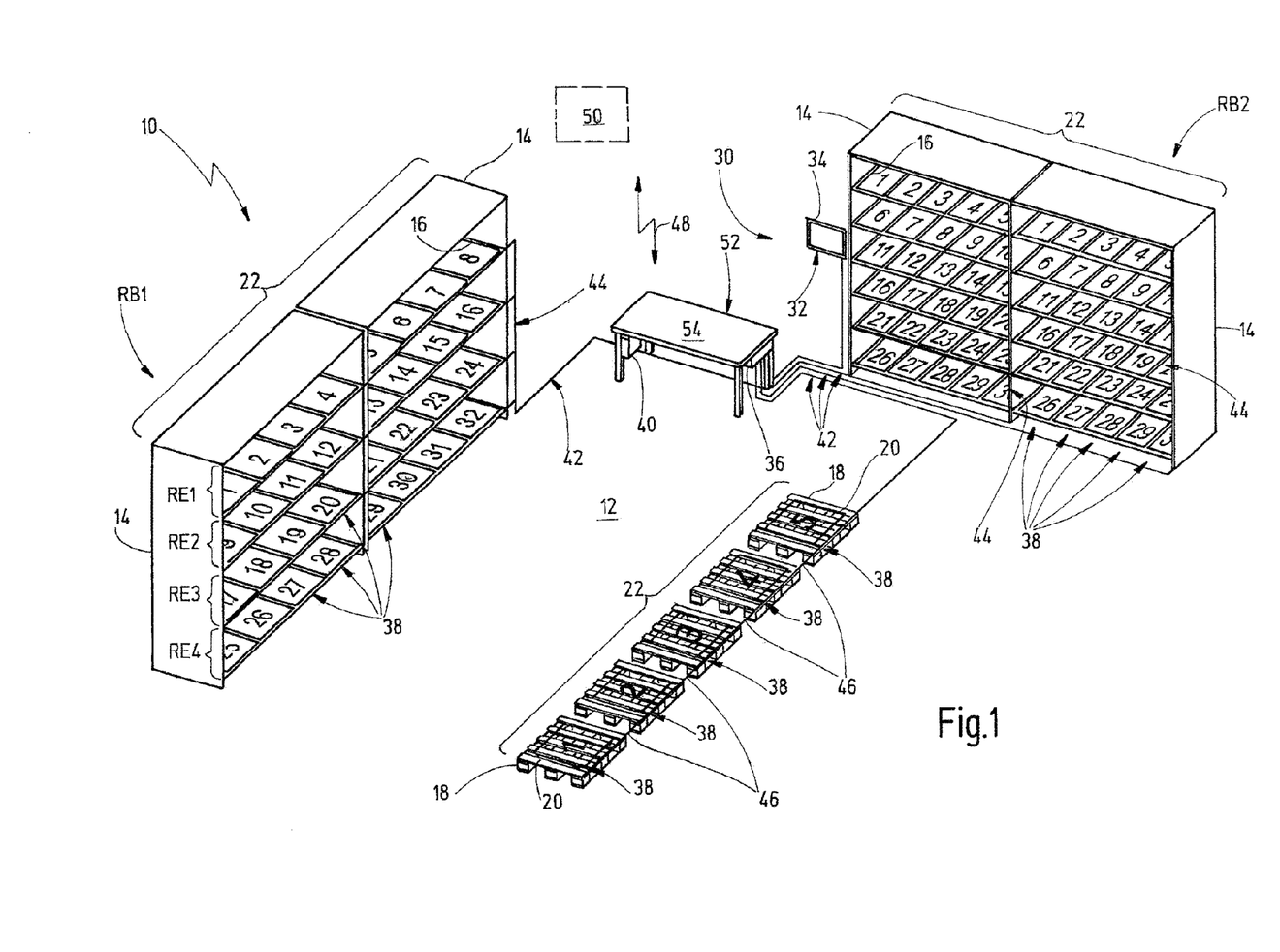
FIG. 1 shows a schematic perspective view of a conventional order-picking warehouse which was retrofitted with the guidance system of the invention.

FIG. 1 shows a perspective view of a (conventional) order-picking warehouses 10, which can be retrofitted with a user-configurable guidance system 30 in accordance with the present invention. The order-picking warehouse 10 comprises a conventional warehouse 12, which consists, for example, of racks 14 having rack storage locations 16, and pallets 18 having pallet storage locations 20. The rack storage locations 16 and the pallet storage locations 20 represent general storage locations 22. However, conventional warehouses are not provided with any electronic data management devices such as warehouse management computers and the like for administrating the warehouses electronically with regard to material flow, storage location management, processing of picking orders and similar.

At the left-hand side of FIG. 1, a first rack block RB1 comprises two broad racks 14. The racks 14 of the rack block RB1 are divided into four rack planes RE1-RE4. Each of the rack planes RE1 to RE4 comprises eight storage locations 22 which, in the present case, are numbered continuously with the numbers 1 through 32 from the upper left to the lower right.

In the upper right of FIG. 1 a second rack block RB2 consisting of two narrow racks 14 is arranged. The narrow racks 14 of the rack blocks RB2 are respectively divided into six rack planes each of which comprises five storage locations 22, which are numbered 1 through 35 for each of the narrow racks 14.

Between the two rack blocks RB1 and RB2, for example, five Europool pallets, representing pallet storage locations 20 numbered by the "1" through "5", are shown on a bottom of a hall.

In accordance with the present invention such a conventional warehouse 12 can be retrofitted with the user-configurable guidance system 30 of the present invention.

The guidance system 30 comprises a master computer 32, which preferably includes a display 34. The guidance system 30 further comprises at least one controller 36 which is arranged, for example, separately from the master computer 32. It is clear that the controller 36 could also be integrated into the master computer 32.

Further, a data base 40 is shown in FIG. 1, which can be provided by the user of the warehouse 12 in terms of a host. Alternatively, the host 40 can be part of the guidance system 30 of the present invention.

The controller 36 is connected to the pallet storage locations 20 and the rack storage locations 16 by means of controller lines 42. Each of the storage locations 22 is assigned to one dedicated storage-location display 38. The storage-location displays 38 can be installed in a supplementary manner by screwing them, for example, to the racks 14.

The controller lines 42 are connected to distributor lines 44, which in turn supply the signals from the controller 36 to the different rack planes in the area of the racks 14. The storage-location displays 38 are connected sequentially in the rack planes. For this purpose, connection lines 46 can be used between different storage units (racks, pallets, etc.) as exemplarily shown between the broad racks 14 of the first rack block RB1. Further, the connection lines 46 are also provided between the pallets 18 of the pallet storage locations 20.

Alternatively, the communication between the controller 36, or the master computer 32, and the plurality of the storage-location displays 38 can be wireless as indicated by means of a double arrow 48.

As an option, the host 40 can also be connected to a super-ordinated warehouse management computer 50, or can be implemented by the warehouse management computer 50 which the operator of the warehouse 12 may have already owned before purchasing the guidance system 30. Consequently, the warehouse management computer 50 is indicated by means of a dashed line.

Additionally, the warehouse 12 can comprise, for example, a work station 52, which exemplarily consists of a table 54 where the warehouse worker can deposit and assemble products, which were retrieved from the storage locations 22, in order to process a picking order.

Figure 2:
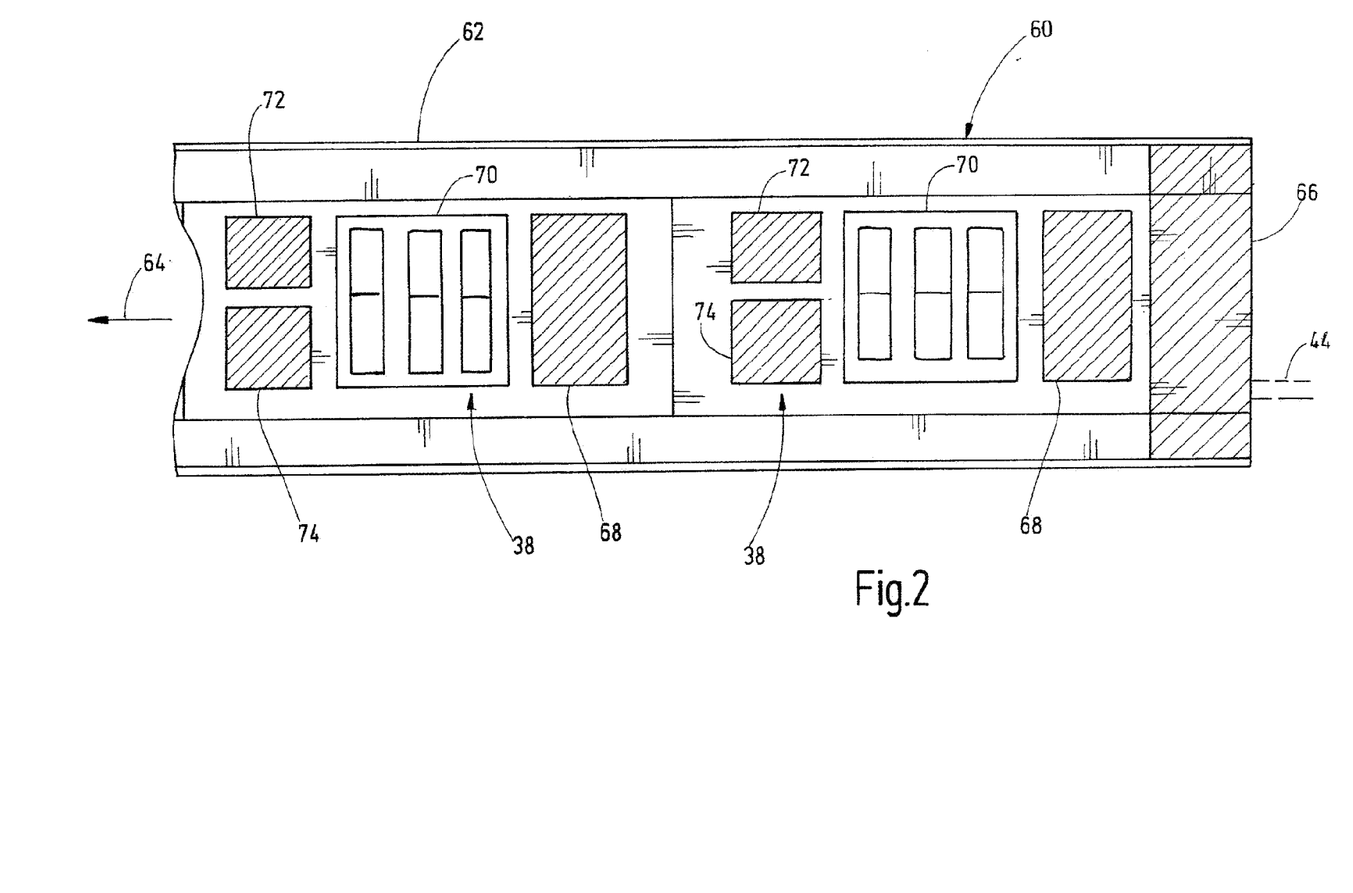
FIG. 2 shows a top view of a storage-location display integrated into a mounting rail.

With reference to FIG. 2 a top view of a strip 60 is shown, which receives the storage-location displays 38 and which can be attached to the storage locations 22. In the present case, the strip 60 can be realized in terms of a rail 62. The rail 62 extends in a longitudinal direction 64. At a right-hand side of the FIG. 2 an exemplary end cap 66 is put on an (open) end of the rail 62. The end cap 66 comprises openings, which are not illustrated here, allowing passage of the lines, wherein one distributor line 44 is exemplarily shown in FIG. 2, the distributor line 44 also being exemplarily shown in the right rack 14 of the second rack block RB2 of FIG. 1.

Each of the storage-location displays 38 preferably comprises a lamp or light 68. Each of the storage-location displays 38 can comprise a numerical display 70, providing a numerical digital indication of numbers, as well as actuating buttons 72 and/or 74, which are also designated as push buttons.

The guidance system 30 allows a warehouse operator to set up an electronically manageable order-picking system by means of guidance-by-light, and to put the order-picking system into operation. A central component of the guidance system 30 is the master computer 32 which allows configuring (mainly assignment of storage location addresses to storage location) and controlling the warehouse 12. Also, picking orders can be processed by means of the master computer 32. Hence, software stored in the master computer 32 provides functionalities which allow the operator, in best case, to configure and operate the warehouse 12 without previous knowledge. The method of the present invention can be implemented in terms of software.

In a first step the operator attaches the strips 60 to the racks 14 as well as to the pallet storage locations 18. Then, the strips 60 and the storage-location displays 38 are connected to the controller 36. The controller 36 substantially functions as a node, and represents a connecting element between the individual storage-location displays 38 and the master computer 32.

Subsequently the controller 36 is addressed by means of an address, i.e. the controller receives a (dedicated) controller address. This address preferably is a global IP address. This global IP address can be preset by the manufacturer of the guidance system 30 (e.g., 172.16.100.11). Good integration into existing network structures is ensured by the usage of IP addresses. In the following, the invention will be explained by using IP addresses exemplarily which does not restrict the to-be-used addresses to the Internet Protocol (IP) standard. It is clear that other address standards can be used as well.

In order to address, i.e. allocate addresses to, a plurality of controllers 36 it should be determined first how many controllers 36 are to be used. Then, the following procedure needs to be repeated for each of these controllers 36: 1.) one controller 36 is connected to the master computer 32; 2.) a connection is established over the standard address of the controller 36, or via an IP address stored in the system configuration if the standard address has already been changed before; 3.) the operator inputs an (IP) address of his choice and confirms same, wherein the (IP) address is stored in the controller 36 or in the master computer 32. The standard addresses can be allocated automatically as soon as the number of controllers used is determined.

It is clear that the just explained steps of addressing are optional. The IP addresses can also be preset in an unchangeable manner by the manufacturer of the guidance system 30.

As soon as cabling the storage-location displays 38 to the controller 36 and the master computer 32 as well as the addressing procedure of the controller(s) is completed, assignment of the storage locations 22 to the storage-location displays 38 (pick faces) can follow. The storage-location displays 38 are addressed, i.e. are assigned or get allocated addresses, in this manner, preferably by means of local IP addresses.

Normally, this happens in accordance with the following steps: 1.) in a warehouse layout, as it will be explained in more detail hereinafter, for example, a rack plane RE is selected; all of the storage-location displays 38 of this rack plane RE, which have not yet been addressed, light their lamps 68; the displays 70 of the storage-location displays 38 show an address which preferably is the lowest and not yet allocated one such as the number "1"; 2.) a user (e.g., a warehouse worker) selects one or more storage-location displays 38 (more displays are selected simultaneously if a to-be-stored product is broader than one single storage location 22, thereby defining one logical storage location having the size of a corresponding number of physical storage locations of a standard size); in this case of over-sized products the user can select a width (i.e., a number of the storage-location displays required for each rack compartment) and a number of compartments which are to be addressed several times by the identical storage-location address; wherein the width can also be adapted in between for compartments being differently broad; 3.) the user confirms (i.e. selects), by means of pushing one of the buttons 72 or 74, all of the storage-location displays 38 of the rack plane one after the other; preferably, address numbers are automatically incremented as a function of compartment widths; as soon as a lighted storage-location display is selected the lamp thereof goes out; 4.) as soon as addressing of the rack plane RE is completed, even if not all of the lighted storage-location displays were selected, this can be signalled by the user to the master computer 32, for example, by using a touch-sensitive monitor 34 thereof; 5.) if this process is completed for each of the rack planes, the user can proceed similarly with regard to the pallet storage locations 20; subsequently, the quantity of the allocated addresses can be checked; subsequently, the procedure ends. It is clear that the performance of the described procedure is independent of rack planes.

With other words, the user selects lighted storage-location displays by actuating the respective push buttons. By selecting one of the lighted storage location displays, a (dedicated) address can be assigned to the selected storage-location display. Since the selected storage-location display is associated with a corresponding storage location, physically and in terms of data, the storage location gets assigned a dedicated storage-location address.

Then, in a further step also products can be assigned to the storage locations 22, which have now respectively received an address. This can happen similarly to the way in which the storage-location displays 38 have been assigned to the storage locations 22. Products are displayed one after the other, for example, on the display 34 to the user. Then, the user can decide based on the (lighted) storage locations 22 where to store the respective product. Subsequently, assigned (in terms of "product—storage location") storage locations displays go out.

Since usually the users already operate a warehouse management system for administrating product and picking data the guidance system 30 of the present invention can be connected to the system (host 40) which is already existing. For establishing connection to an existing data base, for example, the following information should be known: IP address, user name if required, and pass word if required. As soon as this information is confirmed the guidance system 30 can access the user's data base. Relevant data sources can be read allowing usage of product and picking data from the existing data base. For this purpose, common interfaces are integrated into the guidance system 30.

Alternatively, the users can upload files generated by themselves, such as XML files or text files having a preset data format, from an external data carrier (e.g., a USB stick) or otherwise via web services. In this case, the system 30 additionally performs an assignment of products to the storage-location displays automatically.

If a data base or SAP connection exists, the product information (identification) can be retrieved directly by means of the connection, which has been stored in the system in advanced. Then, a table including existing storage-location display addresses and additional information (rack, plane, compartment width) can be displayed to the user. As soon as a storage-location IP address is selected, the corresponding rack plane can be displayed in a warehouse layout additionally. The user can choose an existing product from the menu, and assign the storage-location IP address. In this operation mode the user can activate at any time an indication of the address on the storage-location display 38 for making a corresponding assignment easier for the user.

It is clear that indication characteristics such as color of the actuating button 68, flashing frequency and flashing duration of the display 70, the illumination period of the display 70 as well as confirmation behavior of the buttons 72 and 74 can be set individually.

Figure 3:
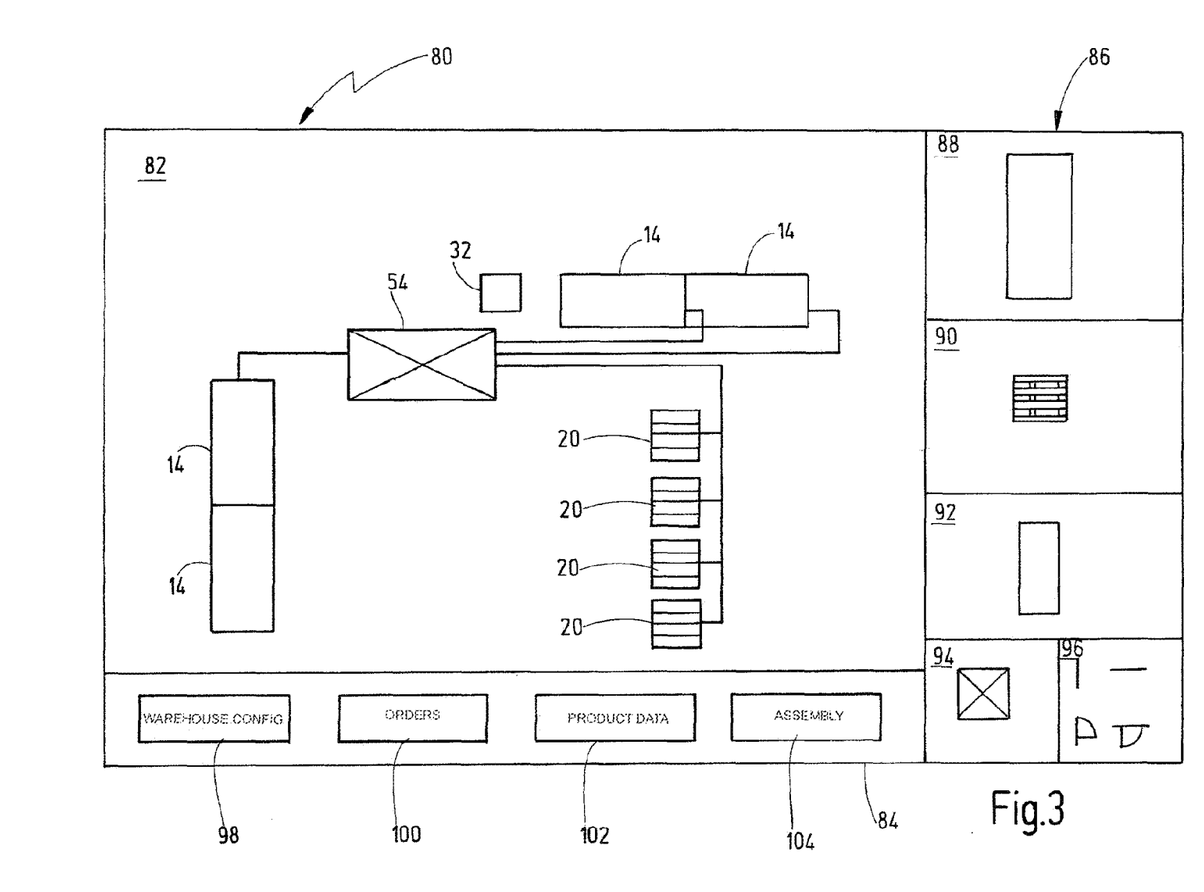
FIG. 3 shows a schematic view of a graphical user interface for mapping the physical structure of an order-picking warehouse.

With reference to FIG. 3 a graphical user interface (GUI) 80 is exemplarily shown such as it can be seen on the display 34 of the master computer 32, if a layout of the physical warehouses 12, as shown in FIG. 1, needs to be defined virtually in the master computer 32. The graphical user interface 80 comprises a main field 82 for graphically representing the warehouse layout as well as a menu bar 84 in the lower horizontal region, and different selection fields 86 in the right vertical region. The selection fields 86 comprise, for example, broad racks 88, pallets 90, narrow racks 92, one working table 94 as well as optional wall elements 96 allowing depicting the walls of a hall in a graphical manner in the main field 82. In particular, the walls 96 facilitate orientation of the warehouse worker who does not necessarily have previous knowledge of information technology (IT).

In the main field 82 the warehouse 12 of FIG. 1 is represented electronically in a virtual manner. Both of the broad racks 14 of the rack block RB1 in the left region can be recognized. It the upper right corner of the main field 82 the two narrow racks 14 of the rack block RB2 are shown. The table 54 of the physical warehouse is arranged between them in terms of a virtual table 94. Beneath the rack block RB2 four pallets 20 are arranged in terms of virtual pallets 90.

The GUI 80 shows the master computer 32 in a warehouse configuration mode allowing generation of a warehouse layout. Alternatively, menu point 100 allows switching to an order-list mode, the menu point "product data" 102 allows switching to product-data administration, and the menu point 104 allows switching to an assembly-instruction mode. It is clear that the four menu points 98 to 104 in FIG. 3 are not to be understood in a restricting manner.

In the assembly-instruction mode 104, for example, photos can be stored showing how to assemble objects based on components, wherein the components are stored at the storage locations 22 in terms of products. As mentioned above, the guidance system 30 of the present invention can be used, for example, for assembling personal computers according to customers' wishes.

The configuration of the guidance system 30 of the invention is really easy. This is true for both, the generation of the warehouse layout and assignment of addresses, and later optionally products, to the storage locations 22. It is not necessary to hire external IT specialists. The present guidance system 30 is perfectly suitable to lead existing warehouses 12, which have been operated up to now without any electronic assistance, into the age of electronic data management at a later time. Acquisition costs for a corresponding system are extremely low. The installation can be done by the operator of the warehouse 12 who is able to physically attach the displays 70 to the warehouse elements, and also with regard to the configuration of the system 30.

Figure 4:
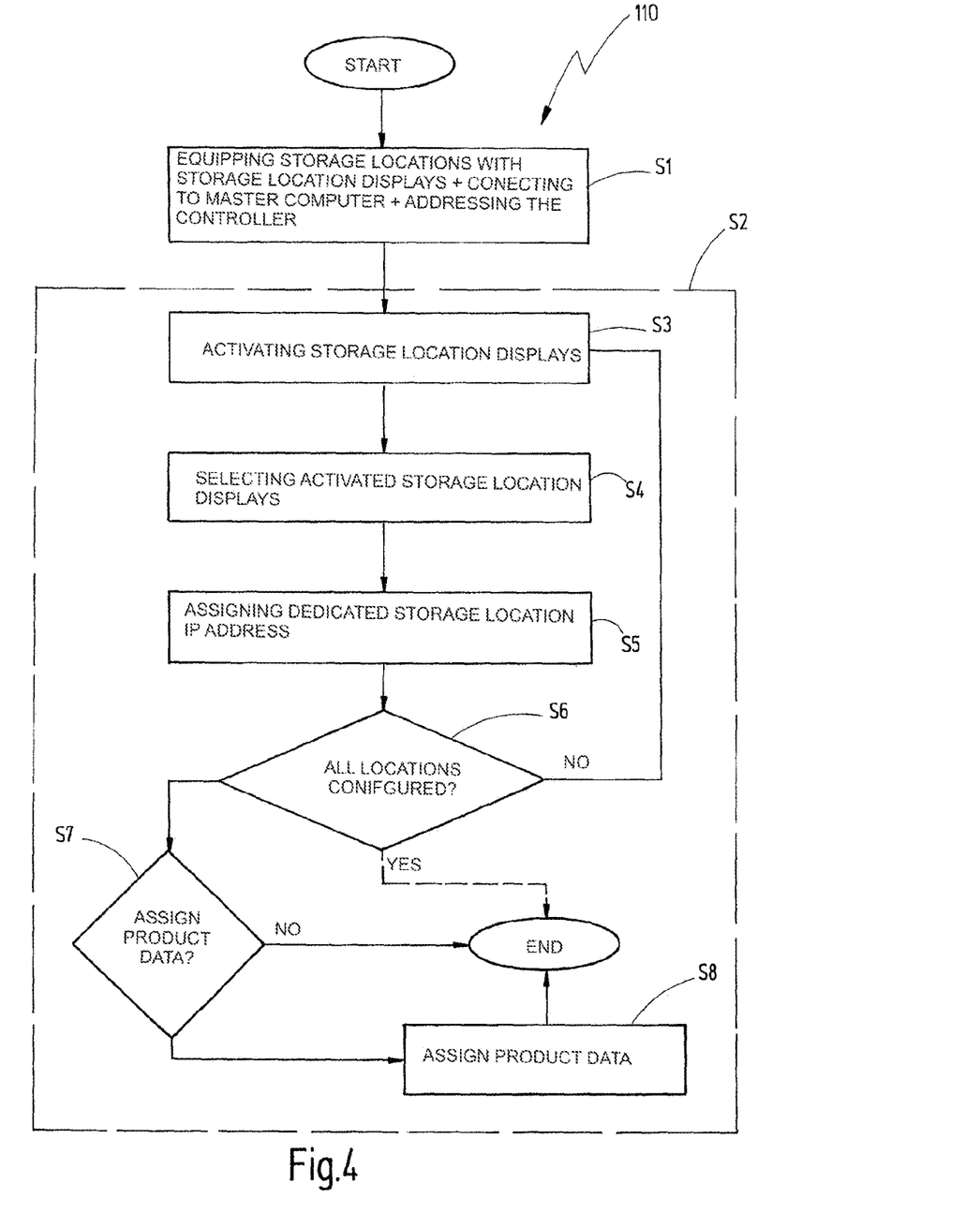
FIG. 4 shows a flow chart of a method of the present invention for configuring an order-picking warehouse as exemplarily shown in FIG. 1.

With reference to FIG. 4 a method 110 according to the invention is depicted in terms of a roughly simplified flow chart. In a first step S1 storage locations 22 are equipped with storage-location displays 38. The storage-location displays 38 are connected to a master computer 32, preferably by means of a controller 36. The controller 36 gets its address in the first step S1, preferably by a global IP address.

In a second step S2, which is divided into a plurality of substeps, the storage locations 22 are addressed.

In a step S3 all of the storage-location displays 38 are activated, i.e. lighted. In a step S4 the warehouse worker can select one of the activated storage locations 22, by actuating one of the actuating buttons 72, 74. Thereby, in a step S5 a dedicated storage location IP address is assigned, and the light goes out. In a step S6 it is inquired whether all of the storage locations 22 are configured. If not all of the storage locations 22 are configured yet, it is returned to the step S3. If all of the storage locations 22 are configured, it can be inquired in a step S7 whether product data are to be signed as well. If no product data are to be assigned, the program ends just like in a situation if the inquiry of the step S7 has not been performed. If the product data need to be assigned, then in a step S8 assignment of the product data is performed.

In general, each storage location which is equipped with respectively one storage-location display is associated with the respective storage-location display, and vice-versa. Each of the storage-locations, which is equipped with its associated storage-location display, needs one unique storage-location address for being addressed correctly within the warehouse. Therefore, the guidance system can have a pool of unique storage-location addresses, each of the unique storage-location addresses being different compared to another one of the storage-location addresses.

Allocating an address to a device is equivalent to assigning an address to a device. If one of the unique storage-location addresses is assigned or allocated to one of equipped storage locations, this unique storage-location address is a dedicated storage location address.

Configuring the warehouse means in particular that the storage-locations which have not yet been assigned a dedicated storage-location address get their respective storage-location address assigned. In general, configuring is equivalent to assigning an address to a storage-location. The address allows communication between the master computer and each of the equipped storage locations such as visually indicating a picking source to the order-picking person and a number of items to be picked by the order-picking person.

Therefore, what we claim is:

1. In an order-picking warehouse which comprises: a plurality of storage locations and a guidance system; wherein the guidance system comprises a plurality of storage-location displays, a master computer, and at least one controller; a method for manually configuring the order-picking warehouse by using the guidance system comprises the following steps:

equipping at least some of the storage locations with respectively one of the storage-location displays so that each of the equipped storage locations is associated with the one of the storage-location displays;

connecting the associated storage-location displays to the master computer via the at least one controller, and allocating to each of the controllers a dedicated controller address; and     configuring the order-picking warehouse by assigning respectively one dedicated storage-location address to each of the equipped storage locations in that:

i.) all of the associated storage-location displays, which have not yet been assigned a dedicated storage-location address, are visually activated;

ii.) at least one of the visually activated storage-location displays is selected by the user, thereby selecting the associated storage location and causing visual deactivation of the selected storage-location display;

iii.) each of the selected storage locations is respectively assigned one dedicated storage-location address; and iv.) it is returned to step i.) until all of the associated storage locations, which have not yet been assigned a dedicated storage-location address, have been assigned a dedicated storage-location address, or until the user no longer wishes to assign dedicated storage-location addresses.

2. The method of claim 1, wherein the master computer presets the storage-location addresses uniquely which are to be assigned to each of the selected storage locations.

3. The method of claim 2, wherein the storage-location addresses preset by the master computer are automatically incremented after each run through a cycle defined by the steps i.) to iii.).

4. The method of claim 1, wherein the storage-location displays respectively comprise a push button, and wherein the step of selecting one of the visually activated storage-location displays comprises manually actuating the push button of the to be-selected storage-location display.

5. The method of claim 1, wherein the storage-location displays respectively comprise a number display and wherein in the step i.) a lowest address number, which has not yet been assigned and corresponds to a dedicated storage-location address which is to be assigned next, is displayed in the respective number display of all of the storage-location displays which have not yet been selected.

6. The method of claim 1, wherein a physical layout of the order-picking warehouse is manually mapped on a grid-shaped warehouse layout surface in a virtual manner in the master computer by using pre-defined warehouse elements such as storage racks locations of different sizes or pallet storage locations.

7. The method of claim 4, wherein the user additionally assigns product data to each of the selected storage locations in that the user walks along the storage locations and assigns the product data by actuating the push buttons step-by-step in accordance with a list of product data.

8. The method of claim 1, wherein the user additionally defines a sequence in which an order-picking person walks through the order-picking warehouse for retrieving and collecting products from the storage locations in accordance with a picking order.

9. The method of claim 8, wherein the master computer comprises a display and wherein the user electronically stores in the master computer an assembly instruction including a plurality of assembling steps, the assembly instruction being associated with the picking order, wherein products are to be retrieved from the associated storage locations in accordance with individual assembling steps are displayed to the order-picking person on the display of the master computer in a graphical manner.

10. The method of claim 8, wherein a plurality of different picking orders is electronically stored in an order list within the master computer.

11. The method of claim 1, wherein the guidance system further comprises mounting rails which attachable to the storage locations and which are adapted to removably receive the storage-location displays.

12. The method of claim 1, wherein the at least one controller is comprised by the master computer.

13. The method of claim 1, wherein the master computer comprises a program memory.

14. The method of claim 1, wherein the master computer comprises a display for assisting the user during configuration of the order-picking warehouse in a visual manner.

15. A user-configurable guidance system of an order-picking warehouse, which comprises a plurality of storage locations which can be of different types, wherein the guidance system comprises:

a plurality of storage-location displays;

a master computer adapted to transmit instructions to the storage-location displays for indicating to a user of the warehouse storage locations and quantities of items to be picked from the storage locations in accordance with a picking order; and     at least one controller connected to the plurality of storage displays and the master computer, the at least one controller allowing transmission of the instructions of the master computer in an addressed manner to the storage-location displays;

wherein respectively one of the storage-location displays is arranged at least at some of the storage locations so that the respectively one of the storage-location displays is associated with the corresponding storage location, wherein the storage-location displays respectively comprise a light, which can be activated and deactivated, and at least one push button; and     wherein the master computer is adapted to:

i.) visually activate all of the associated storage-location displays, which have not yet been assigned a dedicated storage-location address;

ii.) cause visual deactivation of one of the visually activated storage-location displays, if the one of the visually activated storage-location displays is selected by the user for selecting the associated storage location;

iii.) respectively assign one dedicated storage-location address to each of the selected storage locations; and         iv.) return to step i.) until all of the associated storage locations, which have not yet assigned a dedicated storage-location address, have been assigned a dedicated storage-location address, or until the user no longer wishes to assign dedicated storage-location addresses.

16. A non-transitory computer-readable data carrier comprising computer-executable instructions for performing the method of configuring an order-picking warehouse, the order-picking warehouse comprising: a plurality of storage locations and a guidance system; wherein the guidance system comprises a plurality of storage-location displays, a master computer, and at least one controller; wherein at least some of the storage locations are equipped with respectively one of the storage-location displays so that each of the equipped storage locations is associated with the one of the storage-location displays; wherein the associated storage-location displays are connected to the master computer via the at least one controller, and to each of the controllers a dedicated controller address is allocated; the method comprising the step of configuring the order-picking warehouse by assigning respectively one dedicated storage-location address to each of the equipped storage locations in that:

i.) all of the associated storage-location displays, which have not yet been assigned a dedicated storage-location address, are visually activated;

ii.) at least one of the visually activated storage-locations display is selected by the user, thereby selecting the associated storage location and causing visual deactivation of the selected storage-location display;

iii.) each of the selected storage locations is respectively assigned one dedicated storage-location address; and iv.) it is returned to step i.) until all of the associated storage locations, which have not yet assigned a dedicated storage-location address, have been assigned a dedicated storage-location address, or until the user no longer wishes to assign dedicated storage-location addresses.

* * * * *